Aug. 31, 1948.                F. W. GARDNER                  2,448,091
                                LAWNMOWER
                            Filed March 8, 1946
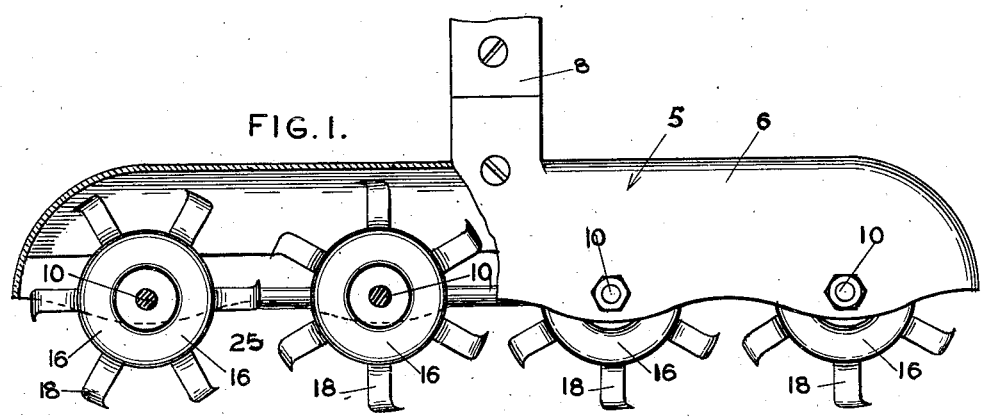
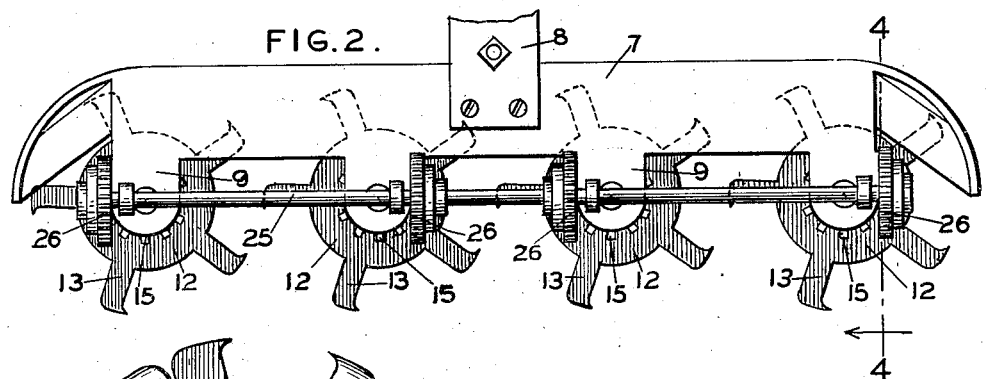
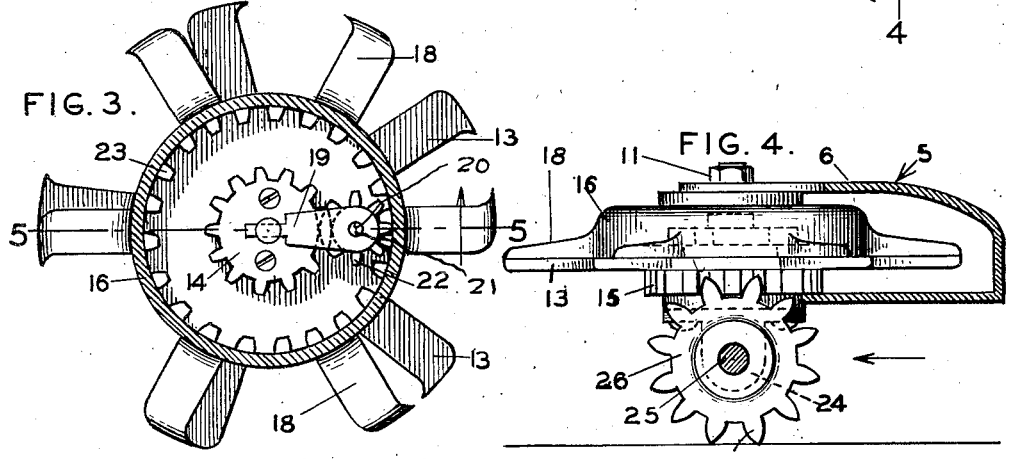
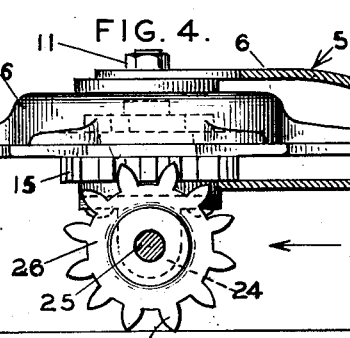
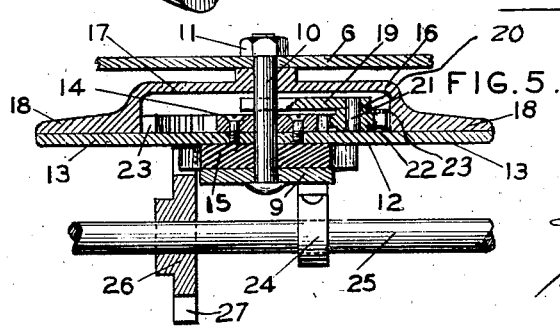
INVENTOR.
FRED W. GARDNER
BY
ATTORNEYS Patented Aug. 31, 1948

2,448,091

UNITED STATES PATENT OFFICE 2,448,091

LAWN MOWER

Fred W. Gardner, Winter Park, Fla.

Application March 8, 1946, Serial No. 653,089

5 Claims. (Cl. 56—295)

The present invention relates to new and useful improvements in lawnmowers, and more particularly to a machine of this character embodying a plurality of horizontally rotatable blades and including upper and lower coacting blades together with means for rotating the blades in opposite directions to perform their cutting action.

A further object of the invention is to provide a mower of this character including a plurality of coacting upper and lower rotating blades operatively connected to each other for opposite rotation together with traction wheels for independently driving each pair of blades.

A further object of the invention is to provide a common shaft to which the traction wheels are secured, whereby all of the rotating blades will be operated even though the contour of the ground will prevent some of the traction wheels from contacting with the ground.

Another object is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a top plan view, with parts broken away and shown in section.

Figure 2 is a bottom plan view.

Figure 3 is an enlarged plan view of one of the pairs of rotating cutters with the disc of the upper cutter removed.

Figure 4 is a transverse sectional view taken substantially on a line 4—4 of Figure 2.

Figure 5 is a transverse sectional view of a pair of the rotating cutters taken substantially on a line 5—5 of Figure 3.

Referring now to the drawings in detail, wherein for the purpose of illustration I have disclosed a preferred embodiment of the invention, the numeral 5 designates the transversely extending guard including forwardly projecting top and bottom walls 6 and 7, respectively, connected to each other at their rear edges and open at their front edges, as shown more clearly in Figure 4 of the drawings. A handle 8 is attached to the rear edge of the guard.

The bottom 7 of the guard is formed with a plurality of longitudinally spaced-apart forwardly projecting tongues 9 through which the lower ends of shafts 10 extend, the upper ends of the shafts projecting upwardly through the top 6 of the guard and secured against rotation therein by nuts 11. A respective lower cutting disc 12 is journaled on each of the shafts 10 above the corresponding tongue 9, each disc 12 having a plurality of blades 13 extending radially therefrom. Upper and lower gears 14 and 15 are secured respectively to the upper and lower sides of the disc 12.

The discs 12 and blades 13 constitute a lower cutter and an upper cutter which includes a disc portion 17 mounted for free rotation on the shaft 10 and spaced above the disc 12 and is also provided with a plurality of radially extending blades 18 arranged in cutting relation with the blades 13.

An arm 19 has one end inserted transversely through the shaft 10 by means of an opening 20 therein, while the outer end of the arm is provided with a pin 21 on which a pinion 22 is journaled. The cutter 16 is formed with an internal gear 23 which is driven from the gear 14 by the pinion 22, the pinion constituting a reversing idler gear interposed between the gear 14 and the gear 23 to provide an operative connection between the upper and lower cutters 12 and 16 to drive the same in opposite directions. The pinion 22 and gears 14 and 23 are constructed of a gear ratio to drive the upper cutter 16 at a reduced speed relative to the cutter 12 and the upper cutter 16 is formed with a greater number of cutting blades 18 than the number of cutting blades 13 for the lower cutter 12 so that the cutting cooperation between pairs of the upper and lower blades will not occur simultaneously and thus require less effort in the operation of the machine.

A bearing bracket 24 is secured to the under side of each of the tongues 9 and in which a transversely extending axle 25 is journaled.

A plurality of ground wheels 26 are secured on the axle 25, each ground wheel including teeth 27 engaging an adjacent corresponding lower gear 15 secured to the under side of the lower cutter 12.

In the operation of the device it will be apparent that as the mower is moved over the ground, the ground wheels 26 will rotate the axle 25 and since each of the ground wheels is engaged with the lower gear 15 of a respective lower cutter 12, all of the cutters will be operated even should the contour of the ground prevent one or more of the ground wheels from operative engagement therewith.

The rotation of the lower cutters 12 by the ground wheels 26 and gears 15 will also cause the rotation of the upper cutters 16 through their operative engagement with the respective lower cutters by the corresponding ring gears 23, pinions 22 and upper gears 14.

It is believed that the details of construction, manner of use and advantages of the device will be readily understood from the foregoing without further detailed explanation.

It is to be understood, however, that even though I have herein shown and described a preferred embodiment of my invention, the same is susceptible of certain changes fully comprehended by the spirit of the invention as herein described, and the scope of the appended claims.

Having thus described the invention, what I claim is:

1. A lawn mower comprising a guard having spaced-apart upper and lower walls with spaced-apart, apertured tongues projecting forwardly from the forward edge of the lower wall and apertures in the upper wall in alignment respectively with the apertures in said tongues, a plurality of shafts each extending through two aligned apertures in and secured to said guard against rotation, lower cutter discs having radially-projecting blades journaled one on each shaft immediately above the corresponding guard tongue, a respective lower gear secured to each lower cutter disc and disposed between the latter and the corresponding guard tongue, an upper gear secured to the upper surface of each lower cutter disc, a respective upper cutter disc journaled on each shaft and having radially-projecting blades cooperating with the blades on the corresponding lower cutter disc, an internal ring gear in each upper cutter disc concentric with the upper gear on the corresponding lower cutter disc, an arm secured to each shaft and projecting outwardly therefrom between the corresponding lower and upper cutting discs, an idler gear on the outer end of each arm meshing with the corresponding upper gear and ring gear to drive the associated upper cutter disc from the lower cutter disc in the reverse direction and at a different speed, axle bearings secured to and depending from the lower wall of said guard, an axle journaled in said bearings, and toothed ground-engaging wheels secured on said axle and meshing respectively with said lower gears to drive said cutter discs as said lawn mower is propelled over the ground.

2. A lawn mower comprising a guard having a top wall and a bottom wall provided with spaced-apart apertures with each bottom wall aperture in alignment with the corresponding top-wall aperture, a plurality of cutter units operatively mounted between said upper and lower guard walls each concentric with a respective pair of aligned apertures and including a shaft extending through said aligned apertures and secured to said guard, axle bearing secured to the under-side of said guard, and toothed, ground-engaging wheels secured on said axle and drivingly engaging respective cutter units.

3. A lawn mower comprising a guard having a top wall and a bottom wall provided with spaced-apart apertures with each bottom wall aperture in alignment with the corresponding top-wall aperture, a plurality of cutter units operatively mounted between said upper and lower guard walls each concentric with a respective pair of aligned apertures and including a shaft extending through said aligned apertures and secured to said guard, axle bearings secured to the under-side of said guard, and toothed, ground-engaging wheels secured on said axle and drivingly engaging respective cutter units, each cutter unit comprising a lower cutting disc having radially-projecting blades and a gear thereon drivingly engaged by the respective ground-engaging toothed wheel, an upper cutter disc having radially-projecting blades, gear means between said cutter discs operative to drive said upper disc from said lower disc in the reverse direction, said cutter discs being journaled on the corresponding shaft and said gear means being secured to said shaft and carried thereby.

4. A lawn mower comprising a guard having a top wall and a bottom wall provided with spaced-apart apertures with each bottom wall aperture in alignment with the corresponding top-wall aperture, a plurality of cutter units operatively mounted between said upper and lower guard walls each concentric with a respective pair of aligned apertures and including a shaft extending through said aligned apertures and secured to said guard, axle bearings secured to the under-side of said guard, and toothed, ground-engaging wheels secured on said axle and drivingly engaging respective cutter units, each cutter unit comprising a lower cutter disc having radially-projecting blades and a gear thereon drivingly engaged by the respective ground-engaging wheel, an upper cutter disc having a number of radially-projecting blades different from the number of blades on said lower cutter disc to preclude shearing action by more than one pair of blades at the same time, gear means between said cutter discs operative to drive said upper disc from said lower disc in the reverse direction, said cutter discs being journaled on said shaft and said gear means including an arm secured to said shaft between said cutter discs, a gear secured on the upper surface of said lower cutter disc, a ring gear in said upper-cutter disc and an idler gear carried by said arm at the outer end thereof and meshing with said ring gear and said lower cutter-disc gear to drive said upper-cutter disc from said lower-cutter disc in the reverse direction.

5. A lawn mower comprising a guard having a top wall and a bottom wall provided with spaced-apart apertures with each bottom wall aperture in alignment with the corresponding top-wall aperture, a plurality of cutter units operatively mounted between said upper and lower guard walls each concentric with a respective pair of aligned apertures and including a shaft extending through said aligned apertures and secured to said guard, axle bearing secured to the under-side of said guard, and toothed, ground-engaging wheels secured on said axle and drivingly engaging respective cutter units, each cutter unit comprising a lower cutter disc having radially-projecting blades and a gear thereon drivingly engaged by the respective ground-engaging wheel, an upper cutter disc having a number of radially-projecting blades different from the number of blades on said lower cutter disc to preclude shearing action by more than one pair of blades at the same time, gear means between said cutter discs operative to drive said upper disc from said lower disc in the reverse direction, said cutter discs being journaled on said shaft and said gear means including an arm secured to said shaft between said cutter discs, a gear secured on the upper surface of said lower cutter disc, a ring gear in said upper-cutter disc and an idler gear carried by said arm at the outer end thereof and meshing with said ring gear and said lower cutter-disc gear to drive said upper-cutter disc from said lower-cutter disc in the reverse direction, said gear means having a ratio such as to drive said upper-cutter disc at a speed different from that at which said lower-cutter disc is driven.

FRED W. GARDNER.

REFERENCES CITED

The following references are of record in the file of this patent:

UNITED STATES PATENTS

| Number | Name | Date |
|---|---|---|
| 222,626 | Gates | Dec. 16, 1879 |
| 784,396 | Hall | Mar. 7, 1905 |
| 1,397,365 | Cook | Nov. 15, 1921 |
| 1,465,279 | Montague | Aug. 21, 1923 |